US007924729B2

(12) United States Patent
Resende

(10) Patent No.: US 7,924,729 B2
(45) Date of Patent: Apr. 12, 2011

(54) DETERMINING A MINIMUM COST SOLUTION FOR RESOLVING COVERING-BY-PAIRS PROBLEM

(75) Inventor: Mauricio Guilherme de Carvalho Resende, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 312 days.

(21) Appl. No.: 12/277,878

(22) Filed: Nov. 25, 2008

(65) Prior Publication Data

US 2010/0128609 A1   May 27, 2010

(51) Int. Cl.
*H04L 12/28* (2006.01)
(52) U.S. Cl. ......... 370/238; 370/255; 709/223; 709/241
(58) Field of Classification Search .................. None
See application file for complete search history.

(56) References Cited

U.S. PATENT DOCUMENTS

| | | | | |
|---|---|---|---|---|
| 5,777,948 | A * | 7/1998 | Ferkinhoff et al. | 709/224 |
| 7,075,892 | B2 * | 7/2006 | Grover et al. | 370/238 |
| 7,464,147 | B1 * | 12/2008 | Fakhouri et al. | 709/223 |
| 7,599,385 | B1 * | 10/2009 | Andrade et al. | 370/238 |
| 7,610,367 | B2 * | 10/2009 | Canright et al. | 709/223 |
| 2004/0111502 | A1 * | 6/2004 | Oates | 709/223 |
| 2004/0260813 | A1 * | 12/2004 | Heisserman et al. | 709/226 |

OTHER PUBLICATIONS

Research Paper entitled "Algorithms for Node Placement in Path-Disjoint Network Monitoring," presented at The AIRO 2008: XXXIX Annual Conference of the Italian Operational Research Society in Ischia, Italy, Sep. 8-11, 2008; Inventor: Mauricio G. C. Resende, 134 pages.

Research Paper entitled "A Random-Keys Genetic Algorithm for Node Placement in Path-Disjoint Network Monitoring," presented at The Sensors 2008: Theory, Algorithms, and Applications Research and Engineering Education Facility (REEF) University of Florida, Shalimar, Florida, Apr. 24-26, 2008; Inventor: Mauricio G. C. Resende, 90 pages.

Research Paper entitled "A Genetic Algorithm With Random-Keys for Node Placement in Path-Disjoint Network Monitoring," presented at The DIMACS/DyDAn Workshop on Internet Tomography, DIMACS~Rutgers University, May 14-16, 2008; Inventor: Mauricio G. C. Resende, 73 pages.

* cited by examiner

*Primary Examiner* — Kwang B Yao
*Assistant Examiner* — Jeffrey M Rutkowski
(74) *Attorney, Agent, or Firm* — Hope Baldauff Hartman, LLC

(57) ABSTRACT

In one method for determining a minimum cost solution for resolving a covering-by-pairs problem, a plurality of covering nodes, a plurality of branch nodes, and a plurality of edges connecting the covering nodes and the branch nodes are given. A plurality of vectors are generated. For each vector in the plurality of vectors, it is determined whether the selected covering nodes cover the branch nodes. Responsive to determining that the selected covering nodes do not cover the branch nodes, each vector is completed so that the selected covering nodes cover the branch nodes. Responsive to determining that selected covering nodes cover the branch nodes or to completing the vector, redundant covering nodes are removed from each vector. The vectors are inserted into a current population. A new population is generated by evolving the current population for at least one generation.

20 Claims, 4 Drawing Sheets

DETERMINING A MINIMUM COST SOLUTION FOR RESOLVING COVERING-BY-PAIRS PROBLEM

BACKGROUND

An Internet service provider may seek to monitor the performance of customer Internet Protocol ("IP") traffic within the service provider's network. For example, the service provider may seek to measure unidirectional reachability, packet loss rate, and packet delay along edge-to-edge paths followed by customer traffic. One proposed way to monitor IP traffic is by deploying two monitors for each edge router in the network. Each of these monitors may be connected to multiple edge routers. Thus, each monitor may monitor more than one edge router.

A content provider may seek to provide redundant content servers for each customer in a network in case one of the data stores fails. For example, each customer receiving Internet Protocol Television ("IPTV") may be assigned two content servers. If the first content server fails, the second content server may continue to provide IPTV to the customer. In this case, each content server may be connected to multiple customers. Thus, each content server may provide IPTV to more than one customer.

The above-described configurations of monitors/edge routers and content servers/customer may be illustrated as a graph under conventional graph theory. In particular, each monitor and each content server may be represented as a covering node, and each edge router and each customer may be represented to as a branch node. In one scenario, a user may be provided a topology that includes multiple covering nodes, multiple branch nodes, and a multiple edges connecting the covering nodes and the branch nodes. Under the so-called covering-by-pairs problem, the service provider selects the covering nodes at a minimum cost such that the branch nodes are covered. A branch node is considered covered if it is connected to two of the covering nodes. The minimum cost may be determined by a variety of criteria, such as a minimum number of covering nodes or a minimum weight of covering nodes.

A basic solution to the covering-by-pairs problem is to simply traverse each branch node and randomly select pairs of covering nodes such that the branch nodes are covered. While this solution may be the easiest, it is generally considered sub-optimal because it does not account for the cost of the covering nodes. For example, this solution may result in each branch node being covered by two independent covering nodes. This type of result can be cost-prohibitive, especially if the covering nodes are relatively expensive. For example, IP traffic monitors and content servers as described above are generally expensive components to purchase, deploy, operate, and maintain.

SUMMARY

Embodiments of the disclosure presented herein include methods, systems, and computer-readable media for determining a minimum cost solution for resolving a covering-by-pairs problem. According to one aspect, a method for determining a minimum cost solution for resolving a covering-by-pairs problem is provided. According to the method, a plurality of covering nodes, a plurality of branch nodes, and a plurality of edges connecting the covering nodes and the branch nodes are given. A plurality of vectors are generated. Each vector may include a plurality of genes. Each gene may have a binary value and may correspond to one of the covering nodes. The binary value of each gene may indicate whether the corresponding covering node is a selected covering node included in a proposed solution or a non-selected covering node not included in the proposed solution. For each vector in the plurality of vectors, it is determined whether the selected covering nodes cover the branch nodes. Responsive to determining that the selected covering nodes do not cover the branch nodes, each vector is completed so that the selected covering nodes cover the branch nodes. Responsive to determining that selected covering nodes cover the branch nodes or to completing the vector, redundant covering nodes are removed from each vector. The vectors are inserted into a current population. A new population is generated by evolving the current population for at least one generation. The minimum cost solution may include the vector with a lowest cost from the new population.

According to another aspect, a system for determining a minimum cost solution for resolving a covering-by-pairs problem is provided. The system includes a memory and a processor functionally coupled to the memory. The memory stores a program containing code for determining the minimum cost solution. The processor is responsive to computer-executable instructions contained in the program and operative to generate a plurality of vectors, determine whether the selected covering nodes cover the branch nodes for each vector in the plurality of vectors, complete each vector so that the selected covering nodes cover the branch nodes responsive to determining that the selected covering nodes do not cover the branch nodes, remove redundant covering nodes from each vector responsive to determining that selected covering nodes cover the branch nodes or to completing the vector, insert the vectors into a current population, and generate a new population by evolving the current population for at least one generation. Each vector may include a plurality of genes. Each gene may have a binary value and may correspond to one of the covering nodes. The binary value of each gene may indicate whether the corresponding covering node is a selected covering node included in a proposed solution or a non-selected covering node not included in the proposed solution. The minimum cost solution may include the vector with a lowest cost from the new population.

According to yet another aspect, a computer-readable medium having instructions stored thereon for execution by a processor to perform a method for determining a minimum cost solution for resolving a covering-by-pairs problem is provided. According to the method, a plurality of covering nodes, a plurality of branch nodes, and a plurality of edges connecting the covering nodes and the branch nodes are given. A plurality of vectors are generated. Each vector may include a plurality of genes. Each gene may have a binary value and may correspond to one of the covering nodes. The binary value of each gene may indicate whether the corresponding covering node is a selected covering node included in a proposed solution or a non-selected covering node not included in the proposed solution. For each vector in the plurality of vectors, it is determined whether the selected covering nodes cover the branch nodes. Responsive to determining that the selected covering nodes do not cover the branch nodes, each vector is completed so that the selected covering nodes cover the branch nodes. Responsive to determining that selected covering nodes cover the branch nodes or to completing the vector, redundant covering nodes are removed from each vector. The vectors are inserted into a current population. A new population is generated by evolving the current population for at least one generation. The minimum cost solution may include the vector with a lowest cost from the new population.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Figure 1:
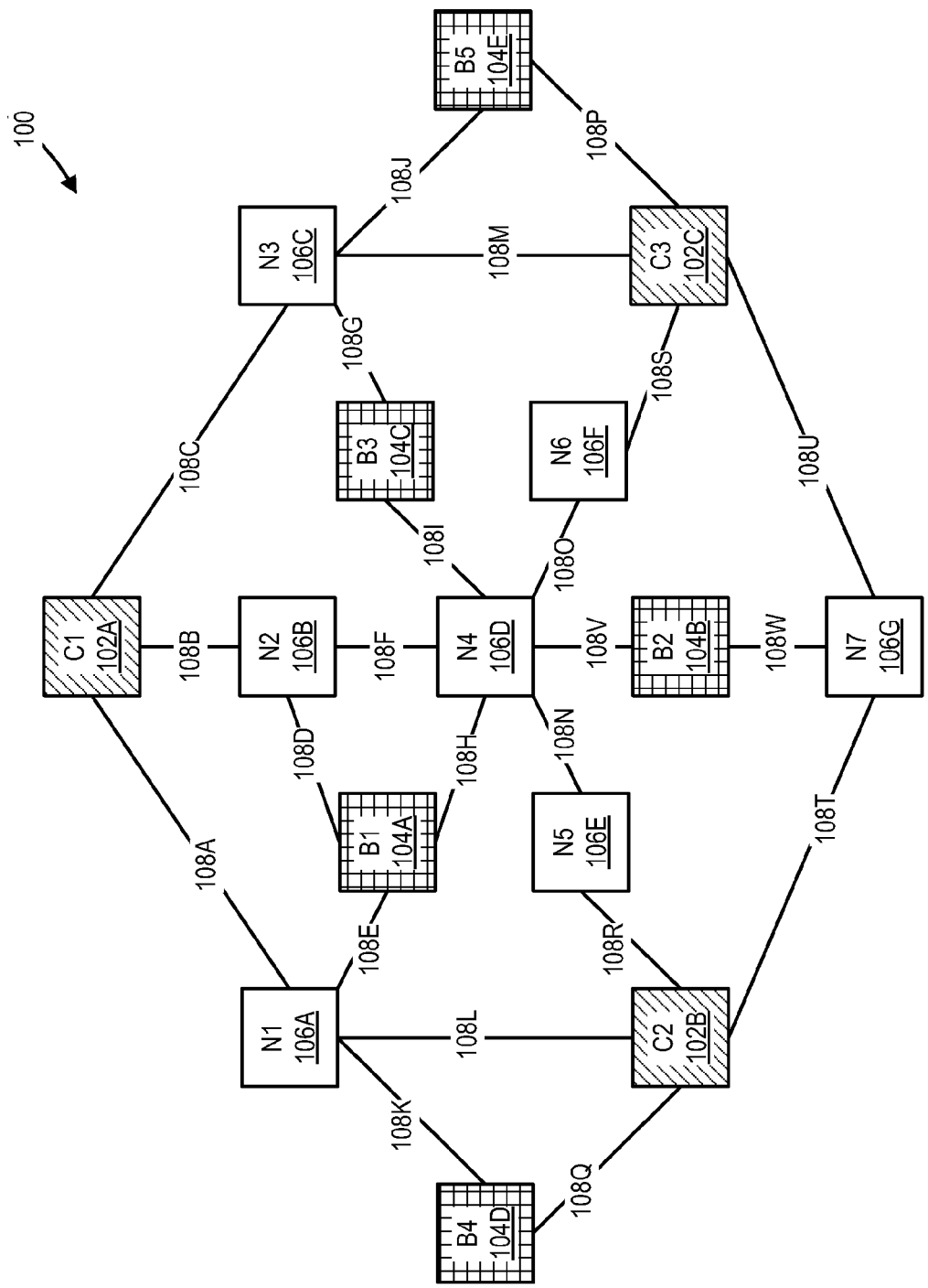
FIG. 1 is a diagram of a graph representation of a plurality of covering nodes covering a plurality of branch nodes, in accordance with exemplary embodiments.

The following detailed description is directed to determining a minimum cost solution for resolving the covering-by-pairs problem. In the covering-by-pairs problem, a graph is provided containing a plurality of covering node, a plurality of branch nodes, and a plurality of edges connecting the covering nodes and the branch nodes. For the sake of simplicity, embodiments described herein refer primarily to a single path between each covering node/branch node pair. However, it should be appreciated that there may be more than one path between each covering node/branch node pair. As used herein, a minimum cost solution refers to a selection of at least a subset of the plurality of covering nodes such that the branch nodes are covered (i.e., connected to two covering nodes) and the cost of the covering nodes is minimized. For the sake of simplicity, the embodiments described herein primarily refer to the case where each covering node is associated with the same weight. Thus, in this case, the minimum cost solution refers to a selection of the fewest number of covering nodes such that the branch nodes are covered. However, it should be appreciated that the embodiments described herein may be similarly applied to weighted covering nodes and other suitable costs associated with the minimum cost solution, as contemplated by those skilled in the art.

Each node in the graph may be assigned an identifier. For example, each covering node may be referred to as C1, C2, C3, . . . etc. and each branch node may be referred to as B1, B2, B3, . . . etc. Using these identifiers, a branch node and its associated covering nodes may be represented as a triplet, (C1, C2, B1). Further, a solution to a given graph may be represented as a vector containing a number of triplets equal to the number of branch nodes. For example, if a graph contains twenty branch nodes, the solution to the graph may be represented as a vector containing twenty triplets, each of which corresponds to a different branch node.

As defined under the covering-by-pairs problem, each triplet contains two paths from the covering nodes to the branch node. For example, a triplet, (C1, C2, B1), includes a first path from C1 to B1 and a second path from C2 to B1. Each of the paths may traverse one or more intermediate nodes between the endpoints. According to embodiments, all of the paths between C1 to B1 and all of the paths between C2 and B1 in a given triplet are disjoint. Two paths are disjoint if they share only the branch node and no other nodes. Thus, in the triplet, (C1, C2, B1), the intermediate nodes along the first path between C1 and B1 are entirely different from the intermediate nodes along the second path between C2 and B1. If a first set of multiple paths exist between C1 and B1 and second set of multiple paths exist between C2 and B1, then the first set of multiple paths is disjoint from the second set of multiple paths if the two sets do not share intermediate nodes.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration, using specific embodiments or examples. Referring now to the drawings, in which like numerals represent like elements through the several figures, aspects of a computing system and methodology for approximating a network of terminals will be described. FIG. 1 shows an illustrative solution 100, which is represented as a graph, to the covering-by-pairs problem. In one embodiment, the solution 100 is generated by a method 200 described in greater detail below with respect to FIG. 2. In particular, the solution 100 may be derived from a larger graph based on the method 200. As illustrated in FIG. 1, the solution 100 contains a plurality of nodes, including a set of covering nodes 102A, 102B, 102C (collectively referred to as covering nodes 102), a set of branch nodes 104A, 104B, 104C, 104D, 104E (collectively referred to as branch nodes 104), and a set of intermediate nodes 106A, 106B, 106C, 106D, 106E, 106F, and 106G (collectively referred to as intermediate nodes 106). The solution 100 further contains a plurality of edges 108A, 108B, 108C, 108D, 108E, 108F, 108G, 108H, 108I, 108J, 108K, 108L, 108M, 108N, 108O, 108P, 108Q, 108R, 108S, 108T, 108U (collectively referred to as edges 108).

In one embodiment, the solution 100 includes the following five triplets corresponding to the five branch nodes 104: a first triplet (C1 102A, C3 102C, B1 104A); a second triplet (C1 102A, C3 102C, B2 104B); a third triplet (C2 102B, C3 102C, B3, 104C); a fourth triplet (C1 102A, C2 102B, B4 104D); and a fifth triplet (C1 102A, C3 102C, B5 104E). In other embodiments, the solution may include alternative covering nodes 102 for one or more of the branch nodes 104. For example, B1 104A, B2 104B, and B5 104E may also be monitored by C2 102B. Further, B3 104C may also be monitored by C1 102A, and B4 104D may also be monitored by C3 102C.

In the first triplet, C1 102A may connect to B1 104A via a first path containing the edges 108A, 108E or a second path containing the edges 108B, 108D. C3 102C may connect to B1 104A via a path containing edges 108H, 108O, 108S. In the second triplet, C1 102A may connect to B2 104B via a path containing the edges 108B, 108F, 108V. C3 102C may connect to B2 104B via a path containing the edges 108U, 108W. In the third triplet, C2 102B may connect to B3 104C via a path containing the edges 108I, 108N, 108R. C3 102C may connect to B3 104C via a path containing the edges 108G, 108M. In the fourth triplet, C1 102A may connect to B4 104D via a path containing the edges 108A 108K. C2 102B may connect to B4 104D via a path containing the edge 108Q. In the fifth triplet, C1 102A may connect to B5 104E via a path containing the edges 108C, 108J. C3 102C may connect to B5 104E via a path containing the edge 108P.

As illustrated in the solution 100, the paths in each of the five triplets are disjoint. That is, in a given triplet, the path between one of the covering nodes and the branch node does not share any edges or intermediate nodes with the path between the other covering node and the branch node. One reason for having disjoint paths in a given triplet is to increase the effectiveness of the redundant covering nodes. For example, regarding the first triplet, C1 102A may correspond to a path containing the edges 108A, 108E and the intermediate node N1 106A, and C3 102C may correspond to a path containing the edges 108H, 108O, 108S and the intermediate nodes N4 106D, N6 106F. If a failure occurs in any of the edges 108A, 108E, 108H, 108O, 108S or any of the intermediate nodes N1 106A, N4 106D, N6 106F, only one of the covering nodes C1 102A, C3 102C is affected.

In one embodiment, the solution 100 represents a network monitoring architecture where the covering nodes 102 represent monitoring nodes (e.g., monitoring equipment) operative to monitor routers, which are represented by the branch nodes 104. In another embodiment, the solution 100 represents a content distribution architecture where the covering nodes 102 represent content servers operative to provide multimedia content to customer destinations, which are represented by the branch nodes 104. The solution 100 may similarly represent other suitable applications of the covering-by-pairs problems, as contemplated by those skilled in the art.

Figure 2:
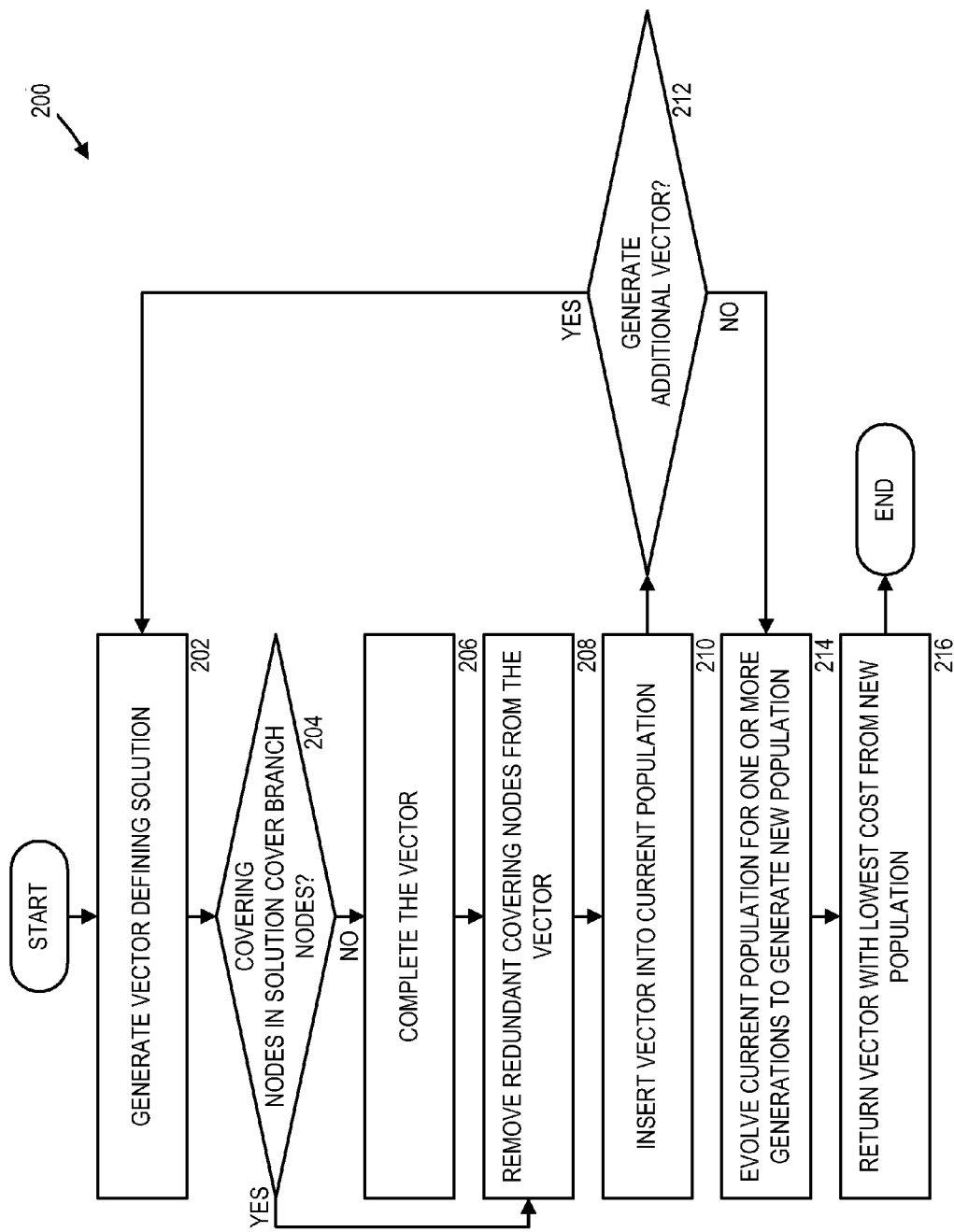
FIG. 2 is a flow diagram illustrating a method for determining a minimum cost solution for resolving a covering-by-pairs problem, in accordance with exemplary embodiments.

FIG. 2 is a flow diagram illustrating the method 200 for generating a minimum cost solution, such as the solution 100, to the covering-by-pairs problem. The method 200 may be embodied in hardware, software, firmware, or combinations thereof. In one embodiment, the method 200 is embodied in a genetic module 416 illustrated in FIG. 4. As previously described, under the covering-by-pairs problem, a plurality of covering nodes, a plurality of branch nodes, and a plurality of edges connecting the covering nodes and the branch nodes are provided. The minimum cost solution includes a selection of covering nodes such that the branch nodes are connected to two covering nodes. Further, for any given triplet of two covering nodes and a corresponding branch node, the paths from the two covering nodes to the branch node are disjoint.

According to the method 200, the genetic module 416 (described below with reference to FIG. 4) generates (at 202) a random or pseudo-random vector, which defines a solution. The vector comprises a plurality of genes, each of which contains a binary value (also referred to herein as an allele). According to embodiments, the size of the vector is equivalent to the number of covering nodes that are provided. For example, if twenty covering nodes are provided, then each vector will contain twenty binary values. Each binary value in the vector corresponds to one of the covering nodes. One binary value indicates that the corresponding covering node is included in the solution, while the other binary value indicates that the corresponding covering node is not included in the solution.

Although not so limited, the examples described herein consider a binary value of one as indicating that the corresponding covering node is included in the solution and a binary value of zero as indicating that the corresponding covering node is not included in the solution. If a binary value in a vector indicates that the corresponding covering node is included in the solution, then the corresponding covering node is referred to herein as a selected covering node. If a binary value in a vector indicates that the corresponding covering node is not included in the solution, then the corresponding covering node is referred to herein as a non-selected covering node. The random or pseudo-random binary values may be generated using any suitable random or pseudo-random number generator as contemplated by those skilled in the art.

Since the vector includes randomly or pseudo-randomly selected binary values, the genetic module 416 may or may not be able to select pairs of covering nodes to correspond to each of the plurality of branch nodes. Thus, the genetic module 416 determines (at 204) whether the branch nodes 104 are covered by the selected covering nodes identified by the vector. If the genetic module 416 determines that the branch nodes 104 are not covered by the selected covering nodes, then the genetic module 416 completes (at 206) the vector according to a greedy process. In one embodiment, under the greedy process, the genetic module 416 considers each of the non-selected covering nodes and the branch nodes covered by the non-selected covering nodes. The genetic module 416 then selects one of the non-selected covering nodes that covers the highest number of the uncovered branch nodes and converts the non-selected covering node to a selected covering node. The genetic module 416 may continue to "greedily" select the non-selected covering nodes that cover the next highest number of the uncovered branch nodes until each of the branch nodes are covered.

It should be appreciated that the genes of a vector do not change values when the vector is completed through the greedy process. The greedy process is only applied to compute the cost of the additional covering nodes in the case that the vector does not cover all branch nodes. However, the vector itself is left unchanged (e.g., the nodes that were identified during the completion are not set to one in the vector). If the genetic module 416 determines that the branch nodes 104 are covered by the selected covering nodes, then the genetic module 416 proceeds to operation 208 which is described below.

Responsive to completing the vector or to determining that the branch nodes 104 are covered by the selected covering nodes, the genetic module 416 removes (at 208) redundant covering nodes from the vector. In one embodiment, the genetic module 416 traverses each of the covering nodes in the vector and considers whether the branch nodes are still covered if the traversed covering node is removed. If the genetic module 416 determines that the branch nodes are still covered by the remaining covering nodes if the traversed covering node is removed, then the traversed covering node is removed. If the genetic module 416 determines that the branch nodes are not covered by the remaining covering nodes if the traversed covering node is removed, then the traversed covering node is not removed.

In one embodiment, the removal of redundant cover nodes is performed at the end, when all vectors in the final population are completed to determine which nodes make up each solution. The redundant node removal process as previously described may be applied for each of these final solutions.

Responsive to removing the redundant covering nodes from the vector, the genetic module 416 inserts (at 210) the vector into a current population. The genetic module 416 then determines (at 212) whether to generate an additional vector. Responsive to the genetic module 416 determining to generate an additional vector, the method 200 loops back to where the genetic module 416 generates (at 202) another vector. Responsive to determining not to generate an additional vector, the genetic module 416 evolves (at 214) the population in one or more successive generations according to the principle of survival of the fittest. Each generation that the population is evolved generates corresponding generations of offspring. Under the theory of survival of the fittest, each generation of offspring is more likely to inherit favorable traits of ancestors. An illustrative method 300 for evolving the current population to form a new population is described in greater detail below with respect to FIG. 3.

The genetic module 416 may evolve the population for any suitable number of generations. In one example, the genetic module 416 may evolve the population until a given number of generations produce little or no further reduction in cost. In another example, the genetic module 416 may evolve the population for a set number of times. In yet another example, the genetic module 416 may evolve the population until a minimum cost is reached. In this case, the minimum cost may be a known lower bound for the plurality of covering nodes, the plurality of branch nodes, and the plurality of edges that are provided. Responsive to evolving the population for one or more generations, the genetic module 416 returns (at 216) a vector with the lowest cost from the new population, and the method 200 ends.

Figure 3:
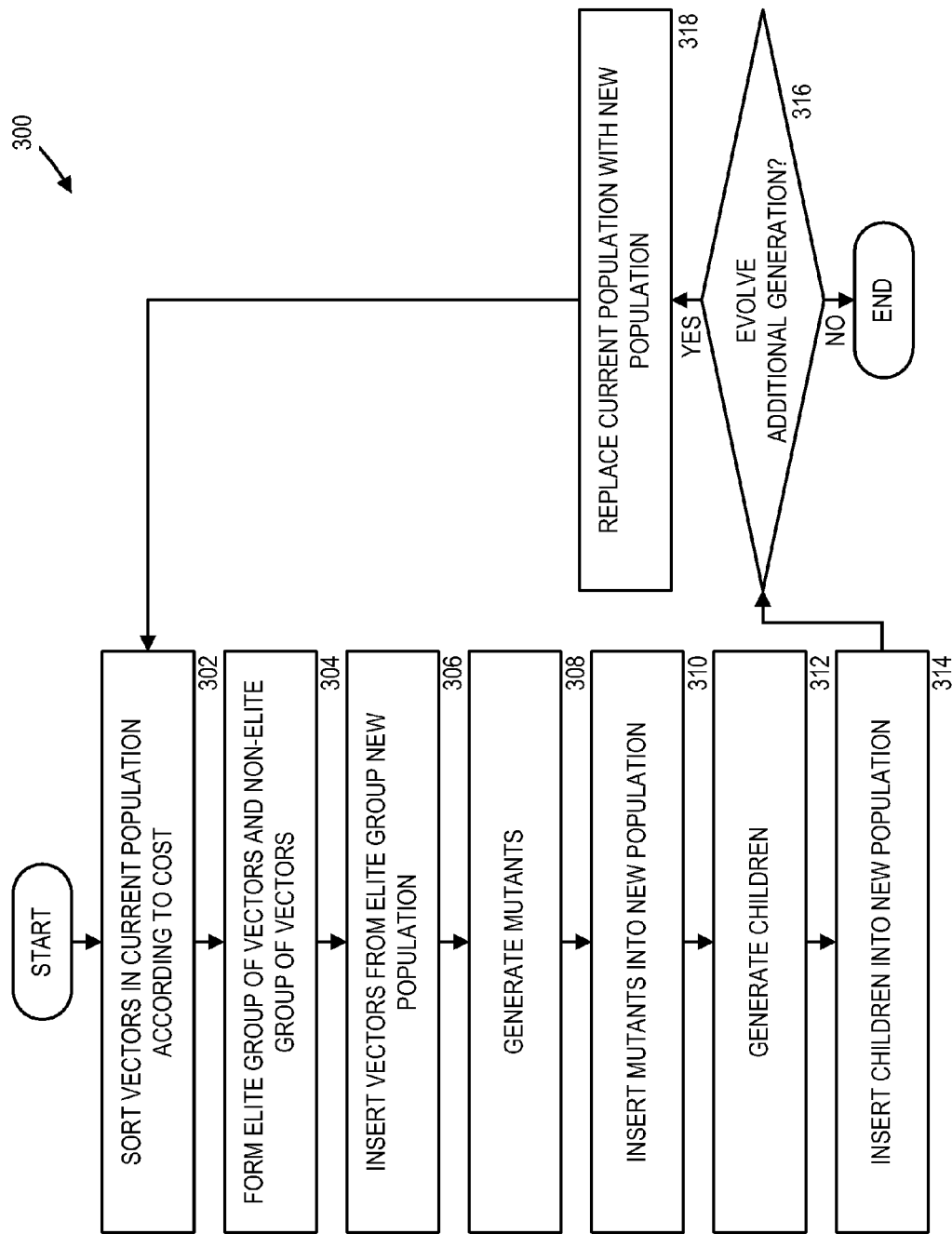
FIG. 3 is a flow diagram illustrated a method for evolving a population of vectors, in accordance with exemplary embodiments.

Referring now to FIG. 3, the method 300 for evolving the population according to the principle of survival of the fittest is illustrated in accordance with exemplary embodiments. The method 300 may be embodied in hardware, software, firmware, or combinations thereof. In one embodiment, the method 300 is embodied in the genetic module 416 illustrated in FIG. 4. As previously described, the genetic module 416 may utilize the method 300 to evolve a population through one or more generations. According to the method 300, the genetic module 416 sorts (at 302) the vectors in the current population according to cost. The genetic module 416 then forms (at 304) an elite group of vectors and a non-elite group of vectors from the current population. In one embodiment, the elite group of vectors include a selection of vectors with the lowest cost. The remaining vectors in the current population may be included in a non-elite group of vectors.

Once the elite group of vectors and the non-elite group of vectors have been formed, the genetic module 416 begins to form a new population from the current population. In particular, the genetic module 416 inserts (at 306) the elite group of vectors into the new population. In one embodiment, the elite group of vectors comprises about 15% of the new population. The genetic module 416 also generates (at 308) a group of one or more mutants and inserts (at 310) the mutants into the new population. As used herein, a mutant refers to a randomly or pseudo-randomly generated vector that is inserted in the new population to introduce noise. In particular, noise may be introduced in the new population in order to escape a local minimum. The genetic module 416 may generate the mutants utilizing any suitable random or pseudo-random number generator. In one embodiment, the mutants comprise about 10% of the new population. The genetic module 416 may also complete the mutants to ensure that all of the branch nodes 104 are covered and remove redundant covering nodes 102 from the mutants prior to inserting the mutants into the new population.

The genetic module 416 also generates (at 312) a group of one or more children vectors and inserts (at 314) the children vectors into the new population. In one embodiment, a child vector is generated based on a first parent vector from the elite group of vectors and a second parent vector from the non-elite group of vectors. As previously described, each vector comprises a plurality of genes, each of which corresponds to one of the covering nodes 102. The binary value of each gene may be referred to as an allele. If the corresponding alleles between the first parent vector and the second parent vector are the same value, then the corresponding allele in the child vector is formed with that value. If the corresponding alleles between the first parent vector and the second parent vector are different values, then the corresponding allele in the child vector is determined according to a biased selection process. The biased selection process may increase the chances that the allele in the first parent vector (from the elite group of vectors) is selected over the allele in the second parent vector (from the non-elite group of vectors). For example, the allele in the first parent vector may have about a 70% chance of being selected while the allele in the second parent vector may have about a 30% chance of being selected. The genetic module 416 may also complete the children vectors to ensure that all of the branch nodes 104 are covered and remove redundant covering nodes 102 from the children vectors prior to inserting the children vectors into the new population.

Responsive to forming the new population, the genetic module 416 determines (at 316) whether to evolve the new population for an additional generation. Responsive to determining to evolve the new population for an additional generation, the genetic module 416 replaces (at 318) the current population with the new population so that the new population becomes the current population. The method 300 loops to where the genetic module 416 sorts (at 302) the vectors in the current population (i.e., the previous new population) according to cost. Responsive to determining not to evolve the new population for an additional generation, the method 300 ends.

Figure 4:
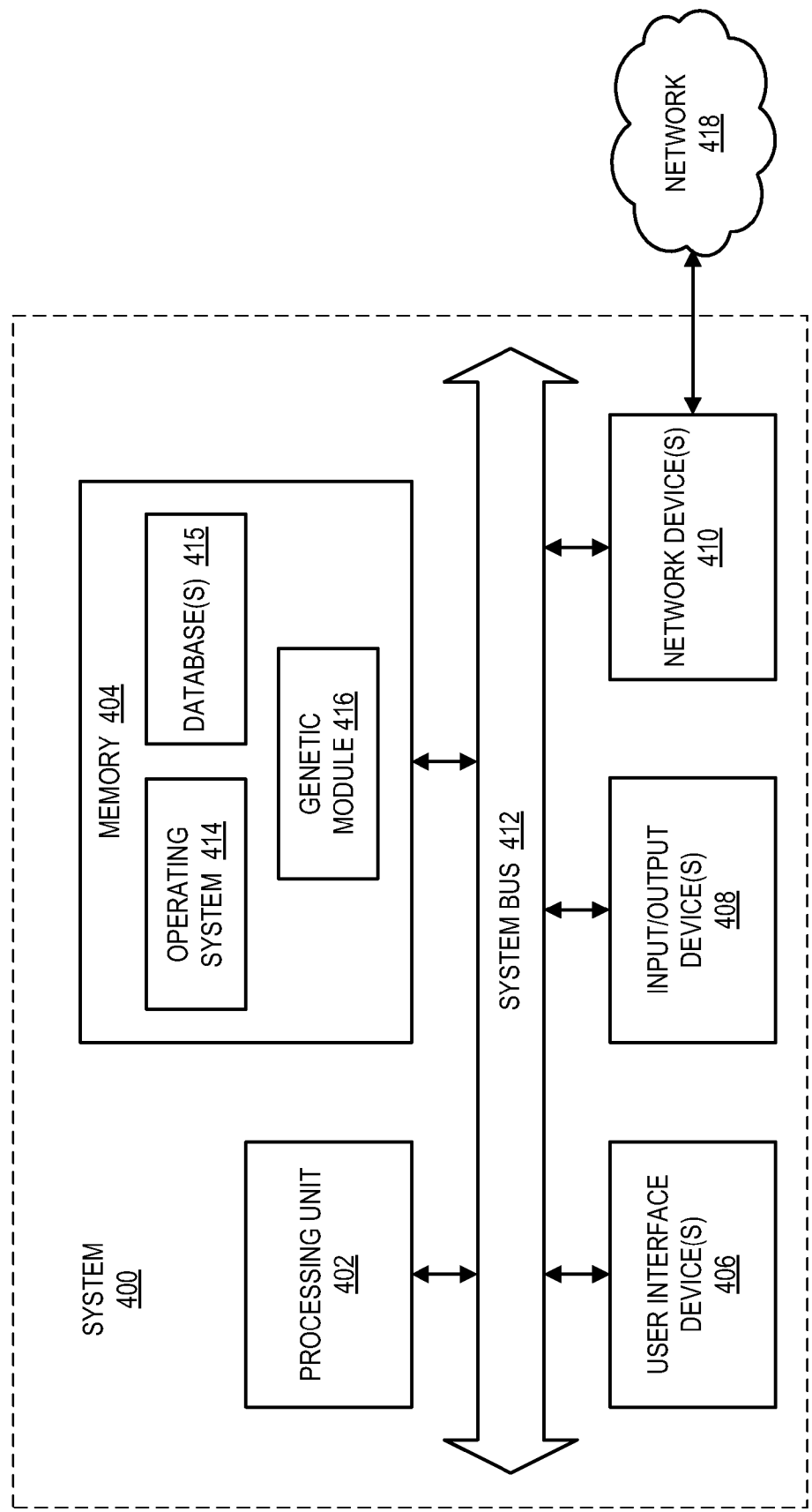
FIG. 4 is a computer architecture diagram showing aspects of an illustrative computer hardware architecture for a computing system capable of implementing aspects of the embodiments presented herein.

FIG. 4 and the following discussion are intended to provide a brief, general description of a suitable computing environment in which embodiments may be implemented. While embodiments will be described in the general context of program modules that execute in conjunction with an application program that runs on an operating system on a computer system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. The embodiments may also be practiced in distributed computing environments where tasks are performed by remote processing devices that are linked through a communications network. In a distributed computing environment, program modules may be located in both local and remote memory storage devices.

FIG. 4 is a block diagram illustrating a system 400 operative to determine a minimum cost solution for resolving a covering-by-pairs problem, in accordance with exemplary embodiments. The system 400 includes a processing unit 402, a memory 404, one or more user interface devices 406, one or more input/output ("I/O") devices 408, and one or more network devices 410, each of which is operatively connected to a system bus 412. The bus 412 enables bi-directional communication between the processing unit 402, the memory 404, the user interface devices 406, the I/O devices 408, and the network devices 410. Examples of the system 400 include, but are not limited to, computers, servers, personal digital assistants, cellular phones, or any suitable computing devices.

The processing unit 402 may be a standard central processor that performs arithmetic and logical operations, a more specific purpose programmable logic controller ("PLC"), a programmable gate array, or other type of processor known to those skilled in the art and suitable for controlling the operation of the server computer. Processing units are well-known in the art, and therefore not described in further detail herein.

The memory 404 communicates with the processing unit 402 via the system bus 412. In one embodiment, the memory 404 is operatively connected to a memory controller (not shown) that enables communication with the processing unit 402 via the system bus 412. The memory 404 includes an operating system 414, one or more databases 415, and the genetic module 416, according to exemplary embodiments. As previously described, the method 200 as described above with respect to FIG. 2 and the method 300 as described above with respect to FIG. 3 may be embodied in the genetic module 416. Examples of operating systems, such as the operating system 414, include, but are not limited to, WINDOWS and WINDOWS MOBILE operating systems from MICROSOFT CORPORATION, MAC OS operating system from APPLE CORPORATION, LINUX operating system, SYMBIAN OS from SYMBIAN SOFTWARE LIMITED, BREW from QUALCOMM INCORPORATED, and FREEBSD operating system.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the system 400.

The user interface devices 406 may include one or more devices with which a user accesses the system 400. The user interface devices 406 may include, but are not limited to, computers, servers, personal digital assistants, cellular phones, or any suitable computing devices. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. Further, the I/O devices 408 may include one or more output devices, such as, but not limited to, a display screen or a printer.

The network devices 410 enable the system 400 to communicate with other networks or remote systems via a network 418. Examples of network devices 410 may include, but are not limited to, a modem, a radio frequency ("RF") or infrared ("IR") transceiver, a telephonic interface, a bridge, a router, or a network card. The network 418 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. Alternatively, the network 418 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A computer-implemented method for determining a minimum cost solution for resolving a covering-by-pairs problem given a plurality of covering nodes, a plurality of branch nodes, and a plurality of edges connecting the covering nodes and the branch nodes, the method comprising computer-implemented operations for:

generating, through a computer having a processor and a memory, a plurality of vectors, each vector comprising a plurality of genes, each gene having a binary value and corresponding to one of the covering nodes, the binary value of each gene indicating whether the corresponding covering node is a selected covering node included in a proposed solution or a non-selected covering node not included in the proposed solution;

for each vector in the plurality of vectors, determining, through the computer, whether the selected covering nodes cover the branch nodes;

responsive to determining that the selected covering nodes do not cover the branch nodes, completing, through the computer, each vector so that the selected covering nodes cover the branch nodes;

responsive to determining that selected covering nodes cover the branch nodes or to completing the vector, removing, through the computer, redundant covering nodes from each vector;

inserting, through the computer, the vectors into a current population; and generating, through the computer, a new population by evolving the current population for at least one generation, the minimum cost solution comprising the vector with a lowest cost from the new population.

2. The computer-implemented method of claim 1, wherein completing each vector so that the selected covering nodes cover the branch nodes comprises:

selecting, through the computer, one of the non-selected covering nodes that covers a highest number of uncovered branch nodes;

changing, through the computer, the binary value of the gene corresponding to the one of the non-selected covering nodes to indicate that the one of the non-selected covering nodes becomes one of the selected covering nodes; and repeating, through the computer, the operations of selecting one of the non-selected covering nodes and changing the binary value of the gene corresponding to the one of the non-selected covering nodes until the selected covering nodes cover the branch nodes.

3. The computer-implemented method of claim 1, wherein removing redundant covering nodes from each vector comprises:
selecting, through the computer, one of the selected covering nodes;
determining, through the computer, whether the remaining selected covering nodes cover the branch nodes if the one of the selected covering nodes is removed;
responsive to determining that the remaining selected covering nodes cover the branch nodes if the one of the selected covering nodes is removed, removing, through the computer, the one of the selected covering nodes; and
repeating, through the computer, the operations of selecting one of the selected covering nodes, determining, through the computer, whether the remaining selected covering nodes cover the branch nodes, and removing, through the computer, the one of the selected covering nodes responsive to determining that the remaining selected covering nodes cover the branch nodes until the selected covering nodes have each been selected.

4. The computer-implemented method of claim 1, wherein generating a new population by evolving the current population for at least one generation comprises:
sorting, through the computer, the vectors in the current population according to cost;
forming, through the computer, an elite group of vectors and a non-elite group of vectors from the current population, the elite group of vectors comprising a portion of vectors in the current population with the lowest cost;
inserting, through the computer, the elite group of vectors into the new population;
randomly or pseudo randomly generating, through the computer, mutant vectors;
inserting, through the computer, the mutant vectors into the new population;
generating, through the computer, children vectors based on a first parent from the elite group of vectors and a second parent from the non-elite group of vectors;
inserting, through the computer, the children vectors into the new population;
determining, through the computer, whether to further evolve the new population;
responsive to determining to further evolve the new population, replacing, through the computer, the current population with the new population so that the new population becomes the current population, and repeating, through the computer, the operations of sorting the vectors in the current population according to cost, forming an elite group of vectors and a non-elite group of vectors from the current population, inserting the elite group of vectors into the new population, generating mutant vectors, inserting the mutant vectors into the new population, generating children vectors, and inserting the children vectors into the new population until determining not to further evolve the new population; and
responsive to determining not to further evolve the new population, returning, through the computer, the new population.

5. The computer-implemented method of claim 1, wherein the selected covering nodes cover the branch nodes if for each branch node, a first one of the selected covering nodes and a second one of the selected covering nodes are connected to the each branch node; and wherein a first path from the first one of the selected covering nodes to the each branch node and a second path from the second one of the selected covering nodes to the each branch node are disjoint paths.

6. The computer-implemented method of claim 1, wherein the vector with the lowest cost from the new population comprises the vector with a fewest number of covering nodes from the new population.

7. The computer-implemented method of claim 1, wherein the covering nodes comprise multimedia content distribution servers and the branch nodes comprise customer destinations.

8. A system for determining a minimum cost solution for resolving a covering-by-pairs problem given a plurality of covering nodes, a plurality of branch nodes, and a plurality of edges connecting the covering nodes and the branch nodes, comprising:
a memory for storing a program for determining the minimum cost solution; and
a processor functionally coupled to the memory, the processor being responsive to computer-executable instructions contained in the program and operative to:
generate a plurality of vectors, each vector comprising a plurality of genes, each gene having a binary value and corresponding to one of the covering nodes, the binary value of each gene indicating whether the corresponding covering node is a selected covering node included in a proposed solution or a non-selected covering node not included in the proposed solution,
for each vector in the plurality of vectors, determine whether the selected covering nodes cover the branch nodes,
responsive to determining that the selected covering nodes do not cover the branch nodes, complete each vector so that the selected covering nodes cover the branch nodes,
responsive to determining that selected covering nodes cover the branch nodes or to completing the vector, remove redundant covering nodes from each vector,
insert the vectors into a current population, and
generate a new population by evolving the current population for at least one generation, the minimum cost solution comprising the vector with a lowest cost from the new population.

9. The system of claim 8, wherein to complete each vector so that the selected covering nodes cover the branch nodes, the processor is further operative to:
select one of the non-selected covering nodes that covers a highest number of uncovered branch nodes;
change the binary value of the gene corresponding to the one of the non-selected covering nodes to indicate that the one of the non-selected covering nodes becomes one of the selected covering nodes; and
repeat the operations of selecting one of the non-selected covering nodes and changing the binary value of the gene corresponding to the one of the non-selected covering nodes until the selected covering nodes cover the branch nodes.

10. The system of claim 8, wherein to remove redundant covering nodes from each vector, the processor is further operative to
select one of the selected covering nodes;
determine whether the remaining selected covering nodes cover the branch nodes if the one of the selected covering nodes is removed;
responsive to determining that the remaining selected covering nodes cover the branch nodes if the one of the selected covering nodes is removed, remove the one of the selected covering nodes; and repeat the operations of selecting one of the selected covering nodes, determining whether the remaining selected covering nodes cover the branch nodes, and removing the one of the selected covering nodes responsive to determining that the remaining selected covering nodes cover the branch nodes until the selected covering nodes have each been selected.

11. The system of claim 8, wherein to generate a new population by evolving the current population for at least one generation, the processor is further operative to:
sort the vectors in the current population according to cost;
form an elite group of vectors and a non-elite group of vectors from the current population, the elite group of vectors comprising a portion of vectors in the current population with the lowest cost;
insert the elite group of vectors into the new population;
randomly or pseudo randomly generate mutant vectors;
insert the mutant vectors into the new population;
generate children vectors based on a first parent from the elite group of vectors and a second parent from the non-elite group of vectors;
insert the children vectors into the new population;
determine whether to further evolve the new population;
responsive to determining to further evolve the new population, replace the current population with the new population so that the new population becomes the current population, and repeat the operations of sorting the vectors in the current population according to cost, forming an elite group of vectors and a non-elite group of vectors from the current population, inserting the elite group of vectors into the new population, generating mutant vectors, inserting the mutant vectors into the new population, generating children vectors, and inserting the children vectors into the new population until determining not to further evolve the new population; and
responsive to determining not to further evolve the new population, return the new population.

12. The system of claim 8, wherein the selected covering nodes cover the branch nodes if for each branch node, a first one of the selected covering nodes and a second one of the selected covering nodes are connected to the each branch node; and wherein a first path from the first one of the selected covering nodes to the each branch node and a second path from the second one of the selected covering nodes to the each branch node are disjoint paths.

13. The system of claim 8, wherein the vector with the lowest cost from the new population comprises the vector with a fewest number of covering nodes from the new population.

14. A non-transitory computer-readable medium having instructions stored thereon for execution by a processor to provide a method for determining a minimum cost solution for resolving a covering-by-pairs problem given a plurality of covering nodes, a plurality of branch nodes, and a plurality of edges connecting the covering nodes and the branch nodes, the method comprising:
generating a plurality of vectors, each vector comprising a plurality of genes, each gene having a binary value and corresponding to one of the covering nodes, the binary value of each gene indicating whether the corresponding covering node is a selected covering node included in a proposed solution or a non-selected covering node not included in the proposed solution;
for each vector in the plurality of vectors, determining whether the selected covering nodes cover the branch nodes;
responsive to determining that the selected covering nodes do not cover the branch nodes, completing each vector so that the selected covering nodes cover the branch nodes;
responsive to determining that selected covering nodes cover the branch nodes or to completing the vector, removing redundant covering nodes from each vector;
inserting the vectors into a current population; and
generating a new population by evolving the current population for at least one generation, the minimum cost solution comprising the vector with a lowest cost from the new population.

15. The non-transitory computer-readable medium of claim 14, wherein completing each vector so that the selected covering nodes cover the branch nodes comprises:
selecting one of the non-selected covering nodes that covers a highest number of uncovered branch nodes;
changing the binary value of the gene corresponding to the one of the non-selected covering nodes to indicate that the one of the non-selected covering nodes becomes one of the selected covering nodes; and
repeating the operations of selecting one of the non-selected covering nodes and changing the binary value of the gene corresponding to the one of the non-selected covering nodes until the selected covering nodes cover the branch nodes.

16. The non-transitory computer-readable medium of claim 14, wherein removing redundant covering nodes from each vector comprises:
selecting one of the selected covering nodes;
determining whether the remaining selected covering nodes cover the branch nodes if the one of the selected covering nodes is removed;
responsive to determining that the remaining selected covering nodes cover the branch nodes if the one of the selected covering nodes is removed, removing the one of the selected covering nodes;
repeating the operations of selecting one of the selected covering nodes, determining whether the remaining selected covering nodes cover the branch nodes, and removing the one of the selected covering nodes responsive to determining that the remaining selected covering nodes cover the branch nodes until the selected covering nodes have each been selected.

17. The non-transitory computer-readable medium of claim 14, wherein generating a new population by evolving the current population for at least one generation comprises:
sorting the vectors in the current population according to cost;
forming an elite group of vectors and a non-elite group of vectors from the current population, the elite group of vectors comprising a portion of vectors in the current population with the lowest cost;
inserting the elite group of vectors into the new population;
randomly or pseudo randomly generating mutant vectors;
inserting the mutant vectors into the new population;
generating children vectors based on a first parent from the elite group of vectors and a second parent from the non-elite group of vectors;
inserting the children vectors into the new population;
determining whether to further evolve the new population;
responsive to determining to further evolve the new population, replacing the current population with the new population so that the new population becomes the current population, and repeating the operations of sorting the vectors in the current population according to cost, forming an elite group of vectors and a non-elite group of vectors from the current population, inserting the elite group of vectors into the new population, generating mutant vectors, inserting the mutant vectors into the new population, generating children vectors, and inserting the children vectors into the new population until determining not to further evolve the new population; and responsive to determining not to further evolve the new population, returning the new population.

18. The non-transitory computer-readable medium of claim 14, wherein the selected covering nodes cover the branch nodes if for each branch node, a first one of the selected covering nodes and a second one of the selected covering nodes are connected to the each branch node; and wherein a first path from the first one of the selected covering nodes to the each branch node and a second path from the second one of the selected covering nodes to the each branch node are disjoint paths.

19. The non-transitory computer-readable medium of claim 14, wherein the vector with the lowest cost from the new population comprises the vector with a fewest number of covering nodes from the new population.

20. The non-transitory computer-readable medium of claim 14, wherein the covering nodes comprise multimedia content distribution servers and the branch nodes comprise customer destinations.

* * * * *